(12) United States Patent
Iida et al.

(10) Patent No.: US 10,023,203 B2
(45) Date of Patent: Jul. 17, 2018

(54) VEHICLE POWER TRANSMISSION SYSTEM

(71) Applicant: Kabushiki Kaisha F. C. C., Shizuoka (JP)

(72) Inventors: Kaoru Iida, Shizuoka (JP); Ryohei Chiba, Shizuoka (JP); Makoto Sato, Shizuoka (JP); Kazuyoshi Miyachi, Shizuoka (JP); Shouji Makita, Shizuoka (JP)

(73) Assignee: KABUSHIKI KAISHA F.C.C., Shizuoka (JP)

( * ) Notice: Subject to any disclaimer, the term of this patent is extended or adjusted under 35 U.S.C. 154(b) by 145 days.

(21) Appl. No.: 15/137,533

(22) Filed: Apr. 25, 2016

(65) Prior Publication Data

US 2016/0332636 A1    Nov. 17, 2016

(30) Foreign Application Priority Data

May 12, 2015  (JP) ................................. 2015-097105

(51) Int. Cl.
*B60W 10/02* (2006.01)
*B60W 50/035* (2012.01)
(Continued)

(52) U.S. Cl.
CPC .......... *B60W 50/035* (2013.01); *B60W 10/02* (2013.01); *B60W 10/11* (2013.01);
(Continued)

(58) Field of Classification Search
CPC .......... Y10T 477/6425; B60W 50/035; B60W 10/11; B60W 30/181; B60W 10/02; B60W 2520/10; B60W 2710/1005; B60W 2510/1005; B60W 2520/04; B60W 2510/0638; F16H 61/12; F16H 61/682;
(Continued)

(56) References Cited

U.S. PATENT DOCUMENTS

| 2005/0107214 | A1* | 5/2005 | Koenig | .................... F16H 61/12 477/174 |
| 2010/0312423 | A1* | 12/2010 | Steinhauser | ............. B60K 6/48 701/22 |
| 2014/0326570 | A1 | 11/2014 | Isobe et al. | |

FOREIGN PATENT DOCUMENTS

| EP | 1645482 A1 | 4/2006 |
| EP | 1847732 A2 | 10/2007 |

(Continued)

OTHER PUBLICATIONS

Communication dated Oct. 10, 2016 issued in European Patent Application No. 16167067.4, pp. 1-6.

*Primary Examiner* — Roger L Pang
(74) *Attorney, Agent, or Firm* — Polsinelli PC

(57) ABSTRACT

A vehicle power transmission system includes: a transmission; a shift actuator; a clutch; a clutch actuator for mutually switching between the transmission and the shutting off of a driving force at the clutch; and a control device being configured to, when having detected that the vehicle is in the travelling state and that the clutch actuator is abnormal by use of the travelling state detection sensor and the CA abnormality detection sensor, control the operation of the shift actuator and cause the selected gear stage in the transmission to be shifted into neutral before the vehicle comes to a stop while shifting the selected gear stage in the transmission into a gear stage having a lower gear ratio.

8 Claims, 13 Drawing Sheets

(51) Int. Cl.
*B60W 10/11* (2012.01)
*B60W 30/18* (2012.01)
*F16D 13/52* (2006.01)
*F16H 61/12* (2010.01)
*F16H 59/56* (2006.01)
*F16H 61/682* (2006.01)
*F16D 13/56* (2006.01)

(52) U.S. Cl.
CPC .............. B60W 30/18 (2013.01); F16D 13/52 (2013.01); F16H 61/12 (2013.01); *B60W 30/181* (2013.01); *B60W 2510/0638* (2013.01); *B60W 2510/1005* (2013.01); *B60W 2520/04* (2013.01); *B60W 2520/10* (2013.01); *B60W 2710/022* (2013.01); *B60W 2710/1005* (2013.01); *F16D 2013/565* (2013.01); *F16H 59/56* (2013.01); *F16H 61/682* (2013.01); *F16H 2061/128* (2013.01); *F16H 2061/1232* (2013.01); *Y10T 477/6425* (2015.01)

(58) Field of Classification Search
CPC ............... F16H 2061/128; F16H 59/56; F16H 2061/1232
See application file for complete search history.

(56) References Cited

FOREIGN PATENT DOCUMENTS

| | | |
|---|---|---|
| EP | 2799734 A1 | 11/2014 |
| FR | 2834034 A1 | 6/2003 |
| JP | 2004-003674 A | 1/2004 |

* cited by examiner

VEHICLE POWER TRANSMISSION SYSTEM

CROSS-REFERENCE TO RELATED APPLICATION

This application claims priority from Japanese Patent Application No. 2015-097105 filed with the Japan Patent Office on May 12, 2015, the entire content of which is hereby incorporated by reference.

BACKGROUND

1. Technical Field

The present disclosure relates to a vehicle power transmission system.

2. Description of the Related Art

Some self-propelled vehicles such as four-wheeled buggy cars and two-wheeled motor vehicles conventionally include a fail-safe function. The fail-safe function automatically ensures safety if a fault or failure occurs in a device that operates a clutch for transmitting or shutting off rotational driving force of an engine to a transmission.

For example, in a vehicle power transmission system (a control device for a vehicle transmission) disclosed in JP-A-2004-3674, a selected gear stage in the transmission is automatically shifted into neutral if a fault or failure occurs in the device that operates the clutch. Consequently, it is possible to prevent the engine from stalling and facilitate a move of the vehicle while the vehicle is at rest. The vehicle power transmission system includes a transmission having gear stages for changing the rotational speed of the engine, a clutch for transmitting or shutting off the rotational drive of the engine to the transmission, actuators respectively for driving the transmission and the clutch, and a control device for controlling operation of these actuators.

SUMMARY

A vehicle power transmission system includes: a transmission including a plurality of gear stages having gear ratios different from each other, the transmission being configured to transmit a driving force of an engine mounted in a vehicle to a drive wheel of the vehicle while changing the driving force by a selected gear stage; a shift actuator for shifting the selected gear stage in the transmission; a clutch for transmitting or shutting off the driving force transmitted from the engine to or from the transmission; a clutch actuator for mutually switching between the transmitting and the shutting off of the driving force at the clutch; a travelling state detection sensor for detecting whether the vehicle is in a travelling state or in a stopping state; a CA abnormality detection sensor for detecting whether the clutch actuator is normal or abnormal; a shift position sensor for detecting the selected gear stage in the transmission; and a control device for controlling operation of the shift actuator and the clutch actuator, the control device being configured to, when having detected that the vehicle is in the travelling state and that the clutch actuator is abnormal by use of the travelling state detection sensor and the CA abnormality detection sensor, control the operation of the shift actuator and cause the selected gear stage in the transmission to be shifted into neutral before the vehicle comes to a stop while shifting the selected gear stage in the transmission into a gear stage having a lower gear ratio.

BRIEF DESCRIPTION OF THE DRAWINGS

FIG. 4A is a partial cross-sectional view illustrating a manner in which an assist function is exerted, and FIG. 4B is a partial cross-sectional view illustrating a manner in which a slipper function is exerted;

FIG. 14A is an explanatory diagram showing the relationship between the rotational speed of the engine and the vehicle speed depending on the gear stage, and a vehicle speed value common to the gear stages that allows a selected gear stage in the transmission to be shifted (downshifted) into a lower gear stage, FIG. 14B is an explanatory diagram showing the relationship between the rotational speed of the engine and the vehicle speed depending on the gear stage, and an engine rotational speed that allows a selected gear stage to be shifted (downshifted) into a lower gear stage, the engine rotational speed being specified depending on the gear stage in the transmission, and FIG. 14C is an explanatory diagram showing the relationship between the rotational speed of the engine and the vehicle speed depending on the gear stage, and an engine rotational speed common to the gear stages that allows a selected gear stage in the transmission to be shifted (downshifted) into a lower gear stage.

DESCRIPTION OF THE EMBODIMENTS

Figure 1:
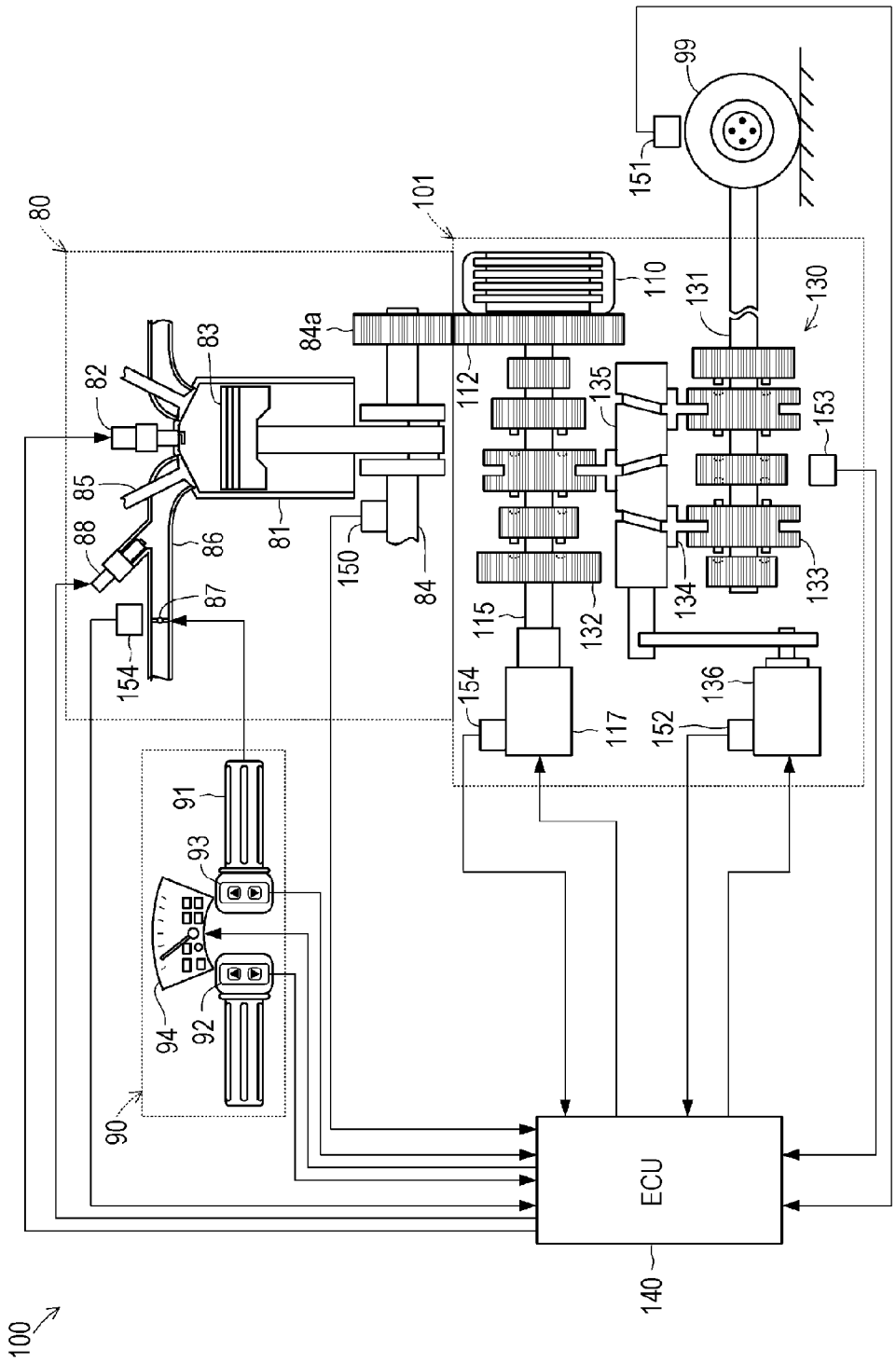
FIG. 1 is a block diagram schematically illustrating an outline of the entire configuration of a vehicle power transmission system according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the vehicle power transmission system described in JP-A-2004-3674, if the transmission shifts into neutral while the self-propelled vehicle is travelling at high speeds, the braking distance is increased. On the other hand, if it is set to wait for an operation of shifting into neutral until the vehicle speed is reduced to a low speed of 15 km/h, the engine may stall during deceleration.

One object of the present disclosure is to provide a vehicle power transmission system such as follows: the system can decelerate a vehicle early while suppressing an engine stall, and enable the vehicle to move while the vehicle is at rest.

A vehicle power transmission system according to one aspect of the present disclosure (the present system) includes: a transmission including a plurality of gear stages having gear ratios different from each other, the transmission being configured to transmit a driving force of an engine mounted in a vehicle to a drive wheel of the vehicle while changing the driving force by a selected gear stage; a shift actuator for shifting the selected gear stage in the transmission; a clutch for transmitting or shutting off the driving force transmitted from the engine to or from the transmission; a clutch actuator for mutually switching between the transmitting and the shutting off of the driving force at the clutch; a travelling state detection sensor for detecting whether the vehicle is in a travelling state or in a stopping state; a CA abnormality detection sensor for detecting whether the clutch actuator is normal or abnormal; a shift position sensor for detecting the selected gear stage in the transmission; and a control device for controlling operation of the shift actuator and the clutch actuator, the control device being configured to, when having detected that the vehicle is in the travelling state and that the clutch actuator is abnormal by use of the travelling state detection sensor and the CA abnormality detection sensor, control the operation of the shift actuator and cause the selected gear stage in the transmission to be shifted into neutral before the vehicle comes to a stop while shifting the selected gear stage in the transmission into a gear stage having a lower gear ratio.

In the present system that has the configuration in this manner, when having detected that the vehicle is in the travelling state and that the clutch actuator is abnormal, the control device controls the operation of the shift actuator and sequentially shifts a selected gear stage into a gear stage having a lower gear ratio (a larger speed reduction ratio) than the selected gear stage, that is, a lower gear stage, in the transmission. Consequently, the control device shifts the selected gear stage in the transmission into neutral before the vehicle comes to a stop. Hence, the control device can gradually reduce the speed of the vehicle by use of an engine brake, and stop the vehicle. As a result, the vehicle power transmission system can decelerate the vehicle early while suppressing the engine from stalling, and enable the vehicle at rest to move.

In the present system, the clutch may include a clutch hub and a pressure plate placed adjacently so as to be approachable to or separable from the clutch hub and be relatively rotatable, the clutch hub holding a clutch plate placed facing a friction plate to be rotationally driven by the driving force transmitted from the engine and transmitting the driving force to the transmission, the pressure plate elastically pressing the friction plate or the clutch plate by a pressure elastic body. The clutch hub and the pressure plate may include a hub-side slipper cam portion and a pressure-side slipper cam portion respectively. The hub-side slipper cam portion and the pressure-side slipper cam portion may each include an inclined surface for reducing a pressing force between the friction plate and the clutch plate when a rotational speed of the drive wheel becomes higher than a rotational speed of the engine.

According to the configuration, in the present system, the clutch hub and the pressure plate have the hub-side slipper cam portion and the pressure-side slipper cam portion, respectively. These hub-side slipper cam portion and pressure-side slipper cam portion each include an inclined surface for reducing a pressing force between the friction plate and the clutch plate that are pressed against each other when the rotational speed of the drive wheel at the clutch becomes higher than the rotational speed of the engine. Hence, when shifting the selected gear stage into a lower gear stage in the transmission, the pressure plate is displaced in a direction away from the clutch hub while being rotationally displaced relative to the clutch hub. In this manner, a slipper function works which reduces the pressing force between the friction plate and the clutch plate. Consequently, in the vehicle power transmission system, the control device can suppress sudden engine braking when shifting the selected gear stage into a lower gear stage in the transmission. As a result, the control device can shift the selected gear stage in the transmission smoothly into neutral.

In the present system, the control device may cause the selected gear stage in the transmission to be shifted into neutral before the vehicle comes to a stop while shifting the selected gear stage in the transmission into an immediate gear stage.

According to the configuration, in the present system, the control device causes the selected gear stage in the transmission to be shifted into neutral before the vehicle comes to a stop while shifting the selected gear stage (the current gear stage) into an immediate lower gear stage in the transmission. Hence, the control device can gradually reduce the speed of the vehicle while suppressing a shift shock due to a downshift, and stop the vehicle smoothly.

The present system may further include at least one of a vehicle speed sensor for detecting the speed of the vehicle and a rotational speed sensor for detecting the rotational speed of the engine. When at least one of the speed of the vehicle and the rotational speed of the engine is found to be equal to or less than a predetermined value by use of at least one of the vehicle speed sensor and the rotational speed sensor, the control device may control the operation of the shift actuator, and cause the selected gear stage in the transmission to be shifted into neutral before the vehicle comes to a stop while shifting the selected gear stage in the transmission into the gear stage having a lower gear ratio.

In this case, the vehicle speed detection sensor can also serve as the travelling state detection sensor.

According to the configuration, in the vehicle power transmission system, when at least one of the speed of the vehicle and the rotational speed of the engine is equal to or less than the predetermined value, the control device controls the operation of the shift actuator, and shifts a selected gear stage into a lower gear stage in the transmission. Hence, it is possible to gradually reduce the speed of the vehicle while suppressing a shift shock due to a downshift, and stop the vehicle smoothly.

In the present system, the predetermined value may be set depending on the gear stage in the transmission.

According to the configuration, in the vehicle power transmission system, the predetermined value of at least one of the speed of the vehicle and the rotational speed of the engine is set depending on the gear stage in the transmission. Hence, the control device can gradually reduce the speed of the vehicle while suppressing a shift shock due to a downshift, and stop the vehicle smoothly.

In the present system, when having detected that the vehicle is in the stopping state and that the clutch actuator is abnormal by use of the travelling state detection sensor and the CA abnormality detection sensor, the control device may control the operation of the shift actuator and shift the selected gear stage in the transmission into neutral.

According to the configuration, in the vehicle power transmission system, when having detected that the vehicle is in the stopping state and that the clutch actuator is abnormal by use of the travelling state detection sensor and the CA abnormality detection sensor, the control device controls the operation of the shift actuator, and shifts a selected gear stage in the transmission into neutral. Hence, the vehicle can be immediately moved while the vehicle is at rest. In other words, it is possible to avoid a situation where the vehicle cannot be moved while the vehicle is at rest.

The present system may further include an SA abnormality detection sensor for detecting whether the shift actuator is normal or abnormal, and when having detected that the vehicle is in the travelling state and that the shift actuator is abnormal by use of the travelling state detection sensor and the SA abnormality detection sensor, the control device may control the operation of the actuator and switch the clutch to a state where the driving force is shut off upon finding that at least one of the speed of the vehicle and the rotational speed of the engine is equal to or less than the predetermined value by use of at least one of the vehicle speed sensor and the rotational speed sensor.

In this case, the control device can control the operation of the clutch actuator before and after the vehicle comes to a stop, and change the clutch to the state where the driving force is shut off.

According to the configuration, in the vehicle power transmission system, when having detected that the vehicle is in the travelling state and that the shift actuator is abnormal by use of the travelling state detection sensor and the SA abnormality detection sensor, if at least one of the speed of the vehicle and the rotational speed of the engine is found to be equal to or less than the predetermined value by use of at least one of the vehicle speed sensor and the rotational speed sensor, the control device controls the operation of the clutch actuator to change the clutch to the state where the driving force is shut off. Hence, even if a failure occurs in the shift actuator, the control device can move the vehicle at rest while suppressing an engine stall.

The present system may further include: an input device for transmitting, to the control device, an instruction input by a driver of the vehicle; and an indication device to be operated and controlled by the control device to indicate information for the driver. When having detected that the clutch actuator is abnormal, the control device may cause the indication device to indicate the abnormality of the clutch actuator, and control the operation of the shift actuator in accordance with the driver's instruction transmitted via the input device to shift the selected gear stage in the transmission into the gear stage having a lower gear ratio.

According to the configuration, in the vehicle power transmission system, the control device indicates an abnormality of the clutch actuator on the indication device and also controls the operation of the shift actuator in accordance with the driver's instruction transmitted from the input device to shift a selected gear stage in the transmission into a lower gear stage. Hence, the driver can select allowing or disallowing of the gear stage shift operation. Furthermore, the driver can grasp the start of the shift operation in advance.

A vehicle power transmission system according to one embodiment of the present disclosure will be described below with reference to the drawings. FIG. 1 is a block diagram schematically illustrating an outline of the entire configuration of a vehicle power transmission system 100 according to the embodiment.

The drawings referred to in the specification are schematically illustrated by, for example, illustrating a part of components exaggeratedly for the purpose of facilitating the understanding of the technology of the present disclosure. Hence, in terms of the dimensions, ratios, and the like between components, there may be differences between the real components and the illustrated components.

The vehicle power transmission system 100 is a group of machines that transmit, to a drive wheel 99, a rotational driving force generated by an engine 80 being a motor of a two-wheeled motor vehicle (what is called a motorcycle). The vehicle power transmission system 100 is provided near the engine 80 in the two-wheeled motor vehicle (for example, below a seat or fuel tank).

The engine 80 here is a motor that is mounted on a two-wheeled motor vehicle (not illustrated) to generate a rotational driving force by combustion of fuel. The engine 80 is what is called a reciprocating engine. Specifically, in the engine 80, a mixture including fuel and air is introduced into a cylinder 81 formed into a tube. The mixture is ignited by an ignition plug 82 and exploded to cause a piston 83 to make reciprocating motion in the cylinder 81. Consequently, a rotational driving force is generated on a crankshaft 84 coupled to the piston 83. The rotational driving force of the crankshaft 84 is transmitted to a clutch 110 via a primary drive gear 84a attached to an end of the crankshaft 84. In the embodiment, the engine 80 is assumed to be what is called a four-stroke engine. However, as a matter of fact, the engine 80 may be what is called a two-stroke engine. Moreover, in the embodiment, the engine 80 is assumed to be a three-cylinder engine provided with three cylinders 81. However, as a matter of fact, the engine 80 may be an engine with four or more cylinders.

The cylinder 81 constituting a combustion chamber in the engine 80 is connected to an intake pipe 86 via an intake valve 85. The intake pipe 86 is a pipe for supplying the mixture into the cylinder 81. The intake pipe 86 includes a throttle valve 87 that adjusts the amount of air to be supplied into the cylinder 81, and an injector 88 that supplies (injects) a spray of the fuel into the cylinder 81. Among the members of the engine 80 described above, the operation of the ignition plug 82 and the injector 88 is controlled by an ECU 140 described below. Moreover, a driver of the vehicle manually operates an accelerator grip 91 provided to a handle unit 90 of the vehicle to operate the throttle valve 87.

The handle unit 90 is provided above a front wheel of the vehicle, and is a unit for steering the vehicle. The handle unit 90 includes a drive switch 92, a shift switch 93, and an indication device 94 in addition to the accelerator grip 91. The drive switch 92 is an operator for instructing the ECU 140 about a travel mode (a manual transmission travel mode, an automatic transmission travel mode, and the like) of the vehicle. Moreover, the shift switch 93 is an operator for instructing the ECU 140 about a selected gear stage in a transmission 130. The drive switch 92 and the shift switch 93 correspond to examples of the input device according to the present disclosure. Moreover, the indication device 94 is a device that indicates, for the driver, various pieces of information such as the vehicle speed, the remaining amount of fuel, the rotational speed of the engine 80, a shift position (selected gear stage), and the operating state and warning of the ECU 140.

(The Configuration of the Vehicle Power Transmission System 100)

The vehicle power transmission system 100 includes a power transmission device 101. The power transmission device 101 is a machine that includes a plurality of gear stages having gear ratios different from each other. The power transmission device 101 changes, by a selected gear stage, the rotational driving force generated by the engine 80 and transmits the rotational driving force. The power transmission device 101 is configured mainly of the clutch 110 and the transmission 130.

The clutch 110 is placed between the engine 80 and the transmission 130 on a transmission path of the rotational driving force generated by the engine 80. The clutch 110 is a machine for transmitting and shutting off the rotational driving force generated by the engine 80 to and from the transmission 130. Specifically, the clutch 110 is provided on one end side (the right-hand side of the illustration) of a main shaft 115 extending like a rod from the transmission 130 as illustrated in FIGS. 2 and 3.

Figure 2:
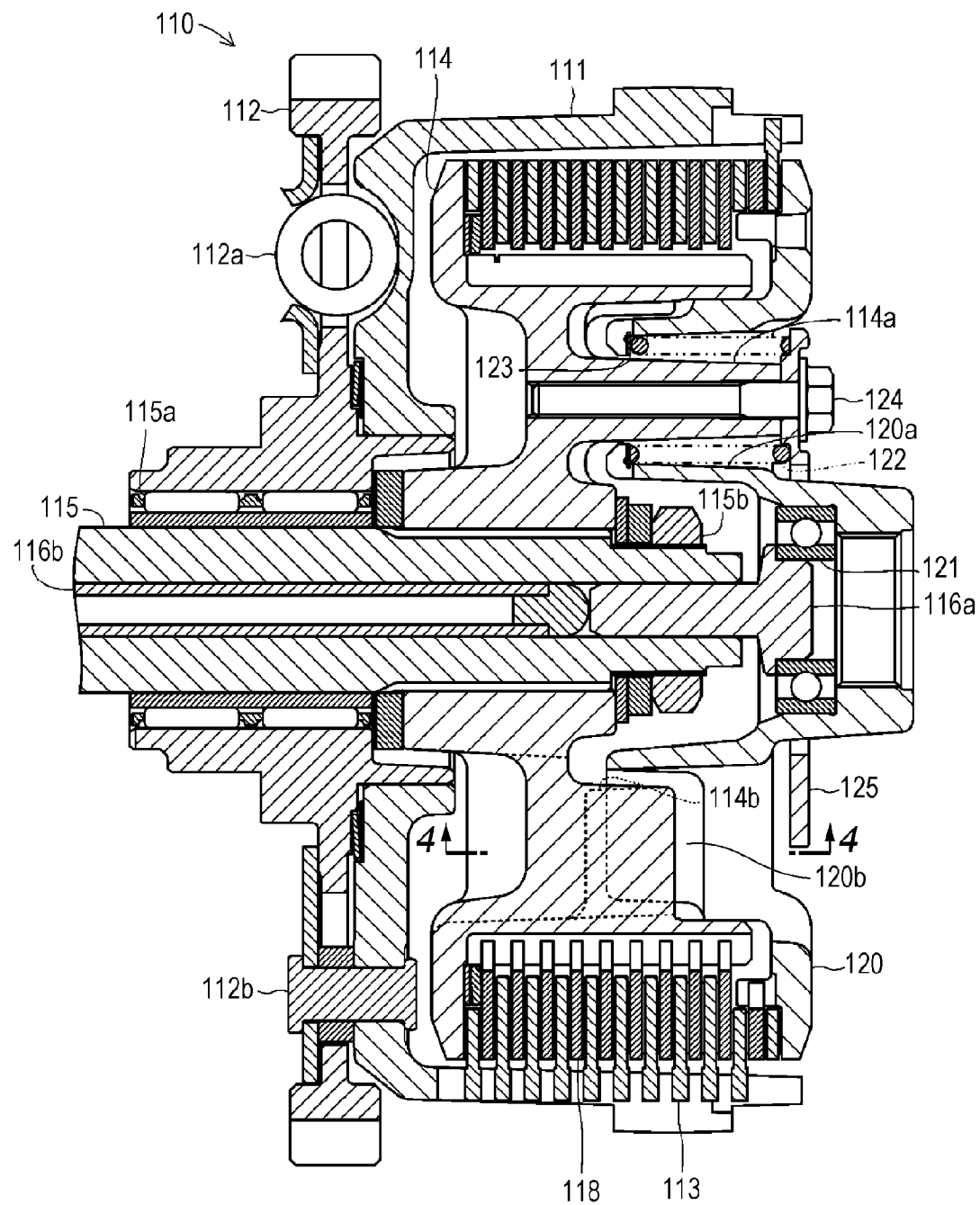
FIG. 2 is a cross-sectional view illustrating an outline of the entire configuration of a clutch in a power transmission device illustrated in FIG. 1.
Figure 3:
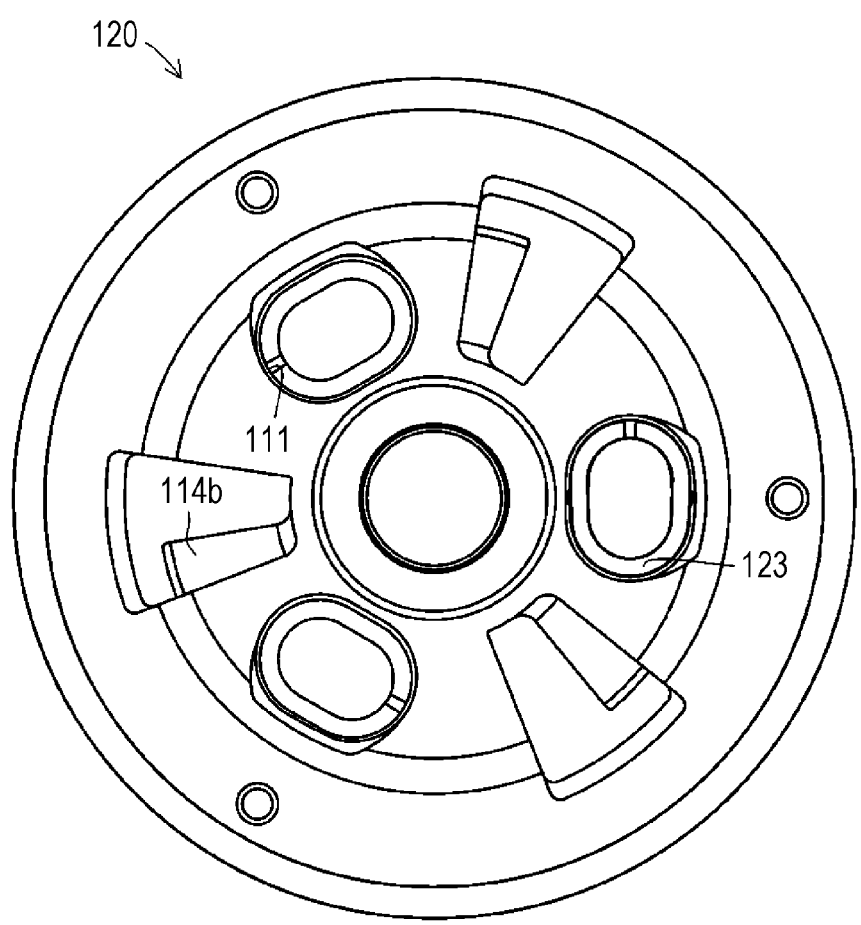
FIG. 3 is a plan view illustrating an outline of an external configuration of a pressure plate assembled in the clutch illustrated in FIG. 2 when viewed from the right-hand side in FIG. 2 to illustrate the relationship between the pressure plate and a hub-side assist cam portion in a clutch hub.

As illustrated in FIG. 2, the clutch 110 includes a clutch housing 111 made of an aluminum alloy. The clutch housing 111 is a member that is formed into a cylinder with a bottom, and is a part of a housing of the clutch 110. A primary driven gear 112 is fixed by a rivet 112b to a left side surface of the clutch housing 111 in the illustration via a torque damper 112a. The primary driven gear 112 is engaged with the primary drive gear 84a integrally coupled with the crankshaft 84 that is rotationally driven by the drive of the engine 80, and is rotationally driven (refer to FIG. 1). An inner peripheral surface of the clutch housing 111 holds a plurality of friction plates 113 by spline fitting so as to be displaceable along the direction of the axis of the clutch housing 111 and be rotatable integrally with the clutch housing 111.

The friction plate 113 is a flat ring-shaped component that is pressed against a clutch plate 118 described below. The friction plate 113 is formed by stamping a thin plate material formed of an SPCC (cold rolled steel) material into a ring shape. A clutch hub 114 formed into a substantially flange shape is placed coaxially with the clutch housing 111 in the clutch housing 111. A plurality of spline grooves is formed along the direction of the axis of the clutch hub 114 on an inner peripheral surface of the clutch hub 114. The main shaft 115 is spline-fitted into the spline grooves.

The main shaft 115 is a shaft body formed into a hollow shape. One end side (the right-hand side of the illustration) (refer to FIGS. 1 and 2) of the main shaft 115 rotatably supports the primary driven gear 112 and the clutch housing 111 via a needle bearing 115a. Furthermore, the end side of the main shaft 115 fixedly supports the clutch hub 114 spline-fitted into the clutch housing 111 via a nut 115b. In other words, the clutch hub 114 rotates integrally with the main shaft 115. On the other hand, the other end side (the left-hand side of the illustration) of the main shaft 115 is coupled to the transmission 130.

The one end side (the right-hand side) of the hollow portion of the main shaft 115 is provided with a push member 116a. Furthermore, a push rod 116b is provided adjacent to the push member 116a so as to extend in the direction of the axis of the main shaft 115. Of these, the push member 116a is a rod-like member extending along the direction of the axis of the main shaft 115. One end (the left-hand side of the illustration) of the push member 116a is slidably fitted into the hollow portion of the main shaft 115. The other end (the right-hand side of the illustration) of the push member 116a is coupled to a release bearing 121 provided to a pressure plate 120.

One end side (the left-hand side of the illustration) of the push rod 116b is coupled to a clutch actuator 117 (refer to FIG. 1) through the inside of the main shaft 115. The other end (the right-hand side of the illustration) of the push rod 116b presses the push member 116a. The clutch actuator 117 is a motor that displaces the push rod 116b reciprocatingly along the axial direction in the main shaft 115 via a hydraulic mechanism (not illustrated) to increase and decrease the force of pushing the push member 116a. The clutch actuator 117 includes an electric motor whose operation is controlled by the ECU 140.

In this case, the ECU 140 controls the operation of the clutch actuator 117 by PWM (Pulse Width Modulation) control. The PWM control here is control that changes the duty cycle of a pulse wave for the clutch actuator 117.

A plurality of the clutch plates 118 is placed on an outer peripheral surface of the clutch hub 114 so as to sandwich the friction plates 113. These clutch plates 118 are held by the clutch hub 114 by spline fitting so as to be displaceable along the direction of the axis of the clutch hub 114 and be rotatable integrally with the clutch hub 114. The clutch plate 118 is a flat, ring-shaped component that is pressed against the friction plate 113. The clutch plate 118 is formed by stamping a thin plate material formed of an SPCC (cold rolled steel) material into a ring shape. An internal spline for being spline-fitted with the clutch hub 114 is formed on an inner peripheral portion of the clutch plate 118.

On the other hand, three tubular support columns 114a, three hub-side assist cam portions 114b, and three hub-side slipper cam portions 114c are formed, protruding toward the pressure plate 120 (the right-hand side of the illustration), inside the clutch hub 114. Among these, the three tubular support columns 114a are cylindrical portions extending in a columnar form to support the pressure plate 120. A female screw is formed on an inner peripheral portion of the tubular support column 114a.

Figure 4A:
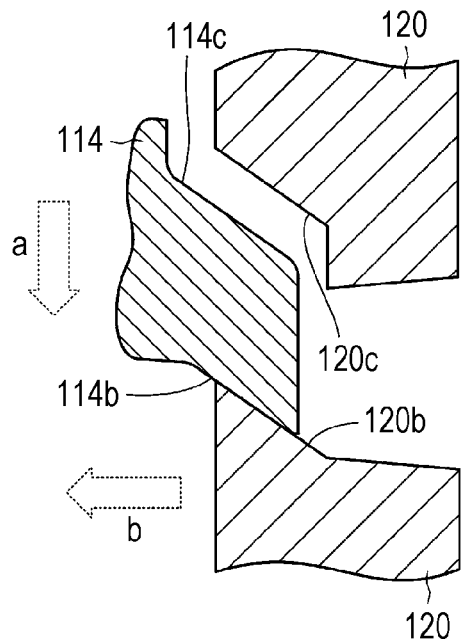
FIGS. 4A and 4B illustrate only main parts of the hub-side assist cam portion, a hub-side slipper cam portion, a pressure-side assist cam portion, and a pressure-side slipper cam portion when viewed from the line 4-4 illustrated in FIG. 2 to explain the operating states of an assist mechanism and a slipper mechanism.

The three hub-side assist cam portions 114b are portions for generating an assist force that increases a pressing force between the friction plate 113 and the clutch plate 118 in cooperation with pressure-side assist cam portions 120b described below. As illustrated in FIG. 4A, the hub-side assist cam portion 114b has an inclined surface gradually protruding toward the pressure plate 120 (the right-hand side of the illustration) along the direction of the circumference of the clutch hub 114. In this case, the three hub-side assist cam portions 114*b* are respectively formed in spaces between the three tubular support columns 114*a*.

Figure 4B:
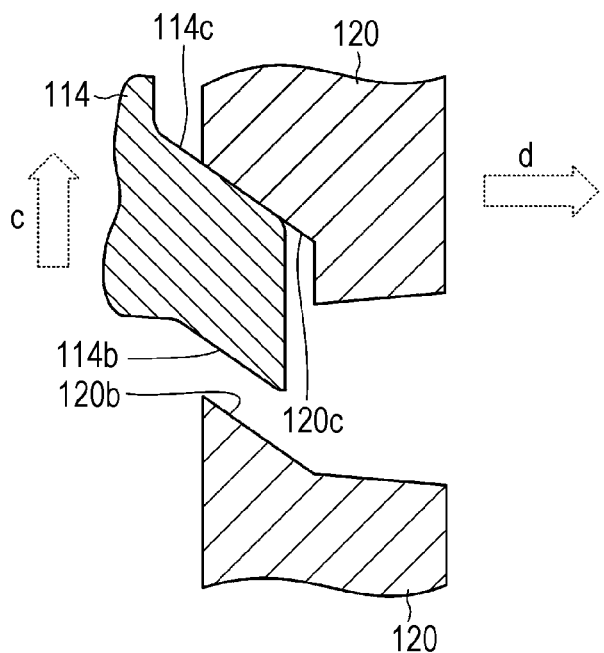

On the other hand, the three hub-side slipper cam portions 114*c* are portions for separating the friction plates 113 and the clutch plates 118 early in cooperation with pressure-side slipper cam portions 120*c* described below as illustrated in FIG. 4B to shift the clutch 110 into a half clutch state. The hub-side slipper cam portion 114*c* has an inclined surface inclined in the same direction as the hub-side assist cam portion 114*b*, on the opposite side in the circumferential direction from the hub-side assist cam portion 114*b*. In FIG. 2, one of the three hub-side assist cam portions 114*b* is indicated by a broken line. Moreover, the half clutch state is a state of the clutch 110 before the friction plate 113 and the clutch plate 118 come fully into close contact with each other. The transmission state in the half clutch state is an incomplete state where part of the rotational driving force of the engine 80 is transmitted to the drive wheel 99 side.

The pressure plate 120 is a component that presses the friction plate 113 to bring the friction plate 113 and the clutch plate 118 into close contact with each other. The pressure plate 120 is configured by forming an aluminum material into a substantially disc shape with substantially the same outer diameter as the outer diameter of the clutch plate 118. Three tubular accommodation portions 120*a*, three pressure-side assist cam portions 120*b*, and three pressure-side slipper cam portions 120*c* are formed, jutting out toward the clutch hub 114 (the left-hand side of the illustration), on the disc surface of the pressure plate 120.

Among these, the three tubular accommodation portions 120*a* are portions in each of which the tubular support portion 114*a* and a clutch spring 122 are accommodated. The tubular accommodation portion 120*a* is formed into a long hole extending in the circumferential direction. More specifically, the tubular support column 114*a* of the clutch hub 114 is placed so as to penetrate in the tubular accommodation portion 120*a*. Furthermore, the clutch spring 122 and a spring sheet 123 are placed outside the tubular support column 114*a*. The clutch spring 122 is an elastic body that is placed in the tubular accommodation portion 120*a*, and exerts an elastic force for pressing the pressure plate 120 toward the clutch hub 114. The clutch spring 122 is configured of a coil spring obtained by winding a spring steel into a spiral. In other words, the clutch spring 122 corresponds to an example of the pressure elastic body according to the present disclosure. The spring sheet 123 is a plate-shaped component placed between a bottom portion of the tubular accommodation portion 120*a* and the clutch spring 122. The spring sheet 123 is a metal plate formed into a C shape in plan view with respect to the bottom portion of the tubular accommodation portion 120*a*. In the embodiment, the spring sheet 123 is formed of a spring steel with a thickness of 0.5 mm.

The three pressure-side assist cam portions 120*b* are portions that slide along the hub-side assist cam portions 114*b* of the clutch hub 114 as illustrated in FIG. 4A. The pressure-side assist cam portion 120*b* has an inclined surface gradually protruding toward the clutch hub 114 (the left-hand side of the illustration) along the direction of the circumference of the pressure plate 120. In other words, the hub-side assist cam portion 114*b* and the pressure-side assist cam portion 120*b* form an assist mechanism. In the assist mechanism, when the rotational speed of the primary driven gear 112 exceeds the rotational speed of the main shaft 115, the pressure-side assist cam portion 120*b* formed on the pressure plate 120 is drawn into the hub-side assist cam portion 114*b* formed on the clutch hub 114 (refer to an arrow a). The cam operation of the hub-side assist cam portion 114*b* and the pressure-side assist cam portion 120*b* displaces the pressure plate 120 in a direction closer to the clutch hub 114 (refer to an arrow b) while being rotationally displaced relative to the clutch hub 114. In this manner, the assist function works which generates the assist force that increases the pressing force between the friction plate 113 and the clutch plate 118.

On the other hand, the three pressure-side slipper cam portions 120*c* are portions that slide along the hub-side slipper cam portions 114*c* as illustrated in FIG. 4B. The pressure-side slipper cam portions 120*c* are formed on the opposite side in the circumferential direction from the pressure-side assist cam portions 120*b*. The pressure-side slipper cam portion 120*c* has an inclined surface extending in the same direction as the pressure-side assist cam portion 120*b*. In other words, the hub-side slipper cam portions 114*c* and the pressure-side slipper cam portions 120*c* form a slipper mechanism.

The pressure plate 120 is attached by three mounting bolts 124 to the clutch hub 114. Specifically, the pressure plate 120 is fixed by clamping the mounting bolt 124 to the tubular support column 114*a* via a stopper member 125 while the tubular support column 114*a* of the clutch hub 114, the spring sheet 123, and the clutch spring 122 are placed in the tubular accommodation portion 120*a*. In this case, the stopper member 125 is a metal member for regulating the amount of displacement of the pressure plate 120 in a direction away from the clutch hub 114. The stopper member 125 is formed into a substantially triangular shape in plan view. Consequently, the pressure plate 120 is attached to the clutch hub 114 so as to be displaceable in directions closer to and away from the clutch hub 114.

A predetermined amount of clutch oil (not illustrated) is filled in the clutch 110. The clutch oil is supplied mainly between the friction plates 113 and the clutch plates 118 to absorb frictional heat generated between them and to suppress the wear of a wear material. In other words, the clutch 110 is what is called a wet multiple plate friction clutch.

The transmission 130 illustrated in FIG. 1 is a machine including a plurality of gear stages (for example, five gear stages). The transmission 130 changes the rotational driving force generated from the engine 80 by a selected gear stage to transmit the rotational driving force to the drive wheel 99. As illustrated in FIG. 1, the main shaft 115 is connected to the crankshaft 84 of the engine 80 via the clutch 110. A countershaft 131 extends parallel to the main shaft 115 and is connected to the drive wheel 99. The transmission 130 has a plurality of gear trains provided between the main shaft 115 and the countershaft 131. The plurality of gear trains forms the plurality of gear stages whose gear ratios are different from each other.

The plurality of gear trains provided between the main shaft 115 and the countershaft 131 each include a drive-side gear 132 provided to the main shaft 115 and a driven-side gear 133 provided to the countershaft 131. The drive-side gear 132 and the driven-side gear 133, which face each other, of each gear train are paired and always engaged with each other. In this case, shift forks 134 are inserted into parts of the drive-side gears 132 and the driven-side gears 133. The shift forks 134 slidingly displace the drive-side gears 132 and the driven-side gears 133 above the main shaft 115 and above the countershaft 131, respectively. Consequently, a dog clutch system causes the drive-side gears 132 to be coupled and separated and causes the driven-side gears 133 to be coupled and separated. In this manner, gear stages are selected (formed).

Figure 5:
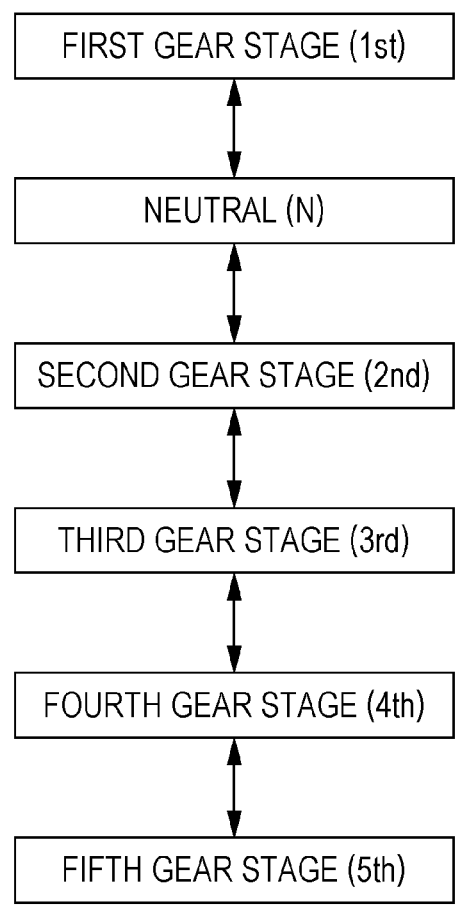
FIG. 5 is an explanatory view schematically showing an interrelationship related to shifts of gear stages in a transmission illustrated in FIG. 1.

In the embodiment, in the transmission 130, the gear stages are formed in series in the order of the first gear stage (1st), neutral (N), the second gear stage (2nd), the third gear stage (3rd), the fourth gear stage (4th), and the fifth gear stage (5th) as shown in FIG. 5. Gear stages can be mutually shifted only between adjacent gear stages. In other words, the gear stage of the transmission 130 is what is called a return transmission.

The shift fork 134 is a fork-shaped component for pressing and sliding the slidingly displaceable drive-side gear 132 and driven-side gear 133 in the direction of the axis to select one gear stage. The shift fork 134 is supported by a shift drum 135. The shift drum 135 is a columnar component for displacing the shift fork 134 reciprocatingly along the main shaft 115 and the countershaft 131. The shift drum 135 is rotationally driven by a shift actuator 136.

The shift actuator 136 is a motor for rotationally driving the shift drum 135 to select one gear stage including the drive-side gears 132 and the driven-side gears 133 in accordance with the angle of rotation of the shift drum 135. The shift actuator 136 includes an electric motor whose operation is controlled by the ECU 140. In this case, the ECU 140 controls the operation of the shift actuator 136 by the PWM control.

The drive-side gear 132 of the main shaft 115 and the driven-side gear 133 of the countershaft 131 are directly engaged with each other. In FIG. 1, for the purpose of description of the configuration, the shift drum 135 is intentionally illustrated between the main shaft 115 and the countershaft 131. In addition, the driven-side gears 133 and the drive-side gears 132 are illustrated separated from each other. Moreover, in the embodiment, the transmission 130 includes six gear stages of the first to fifth gear stages and neutral.

The ECU 140 (Engine Control Unit) is configured of a microcomputer including a CPU, ROM, and RAM. The ECU 140 controls the overall operation of the entire vehicle including the operation of the vehicle power transmission system 100 in accordance with a control program (not illustrated) prestored in the ROM or the like. In this case, the ECU 140 executes a power transmission device fail-safe control program prestored in a storage device such as the ROM. Consequently, the ECU 140 executes fail-safe control if a fault or failure occurs in the power transmission device 101.

The ECU 140 is connected to the drive switch 92 and the shift switch 93. The ECU 140 controls changes of drive modes and shifts of gear stages in accordance with the operations of these switches. Moreover, the ECU 140 is connected to various sensors for acquiring information used to control the operation of the vehicle power transmission system 100. These sensors are provided to, for example, the engine 80 and the power transmission device 101. Specifically, the ECU 140 is connected to a rotational speed sensor 150, a vehicle speed sensor 151, a shift actuator sensor 152, a shift position sensor 153, a clutch actuator sensor 154, and a throttle opening degree sensor 155. In this case, the rotational speed sensor 150 detects the rotational speed of the engine 80 based on the rotational speed of the crankshaft 84. Moreover, the vehicle speed sensor 151 detects the vehicle speed of the two-wheeled motor vehicle according to the embodiment based on the rotational speed of the drive wheel 99 being a rear wheel.

Moreover, the shift actuator sensor 152 is a detector group for detecting the operating state of the shift actuator 136. The shift actuator sensor 152 includes a plurality of detectors. The detectors measure the angle of rotation of the shift actuator 136, the current flowing through the shift actuator 136, and the voltage applied to the shift actuator 136, respectively. Moreover, the shift position sensor 153 detects the selected gear stage in the transmission 130. Moreover, the clutch actuator sensor 154 is a detector group for detecting the operating state of the clutch actuator 117. The clutch actuator sensor 154 includes a plurality of detectors. The detectors measure the angle of rotation of the clutch actuator 117, the current flowing through the clutch actuator 117, and the voltage applied to the clutch actuator 117, respectively. Moreover, the throttle opening degree sensor 155 detects the degree of opening of the throttle valve 87.

Therefore, the ECU 140 controls the operation of the engine 80 and the power transmission device 101 based on detection signals from these various sensors. More specifically, the ECU 140 controls the operation of the ignition plug 82, the injector 88, the clutch actuator 117, and the shift actuator 136. Consequently, the ECU 140 executes control over combustion of the engine 80, control over engagement and disengagement of the clutch 110, and control over a shift of selected gear stages in the transmission 130 (upshifting and downshifting). Moreover, the ECU 140 executes the power transmission device fail-safe control program based on the detection signals from these various sensors to execute the fail-safe control. In other words, the ECU 140 corresponds to an example of the control device according to the present disclosure. Moreover, the ECU 140 is connected to the indication device 94. The ECU 140 indicates, on the indication device 94, the operating state of the ECU 140 and information on various warnings.

(Operation of the Vehicle Power Transmission System 100)

Figure 6:
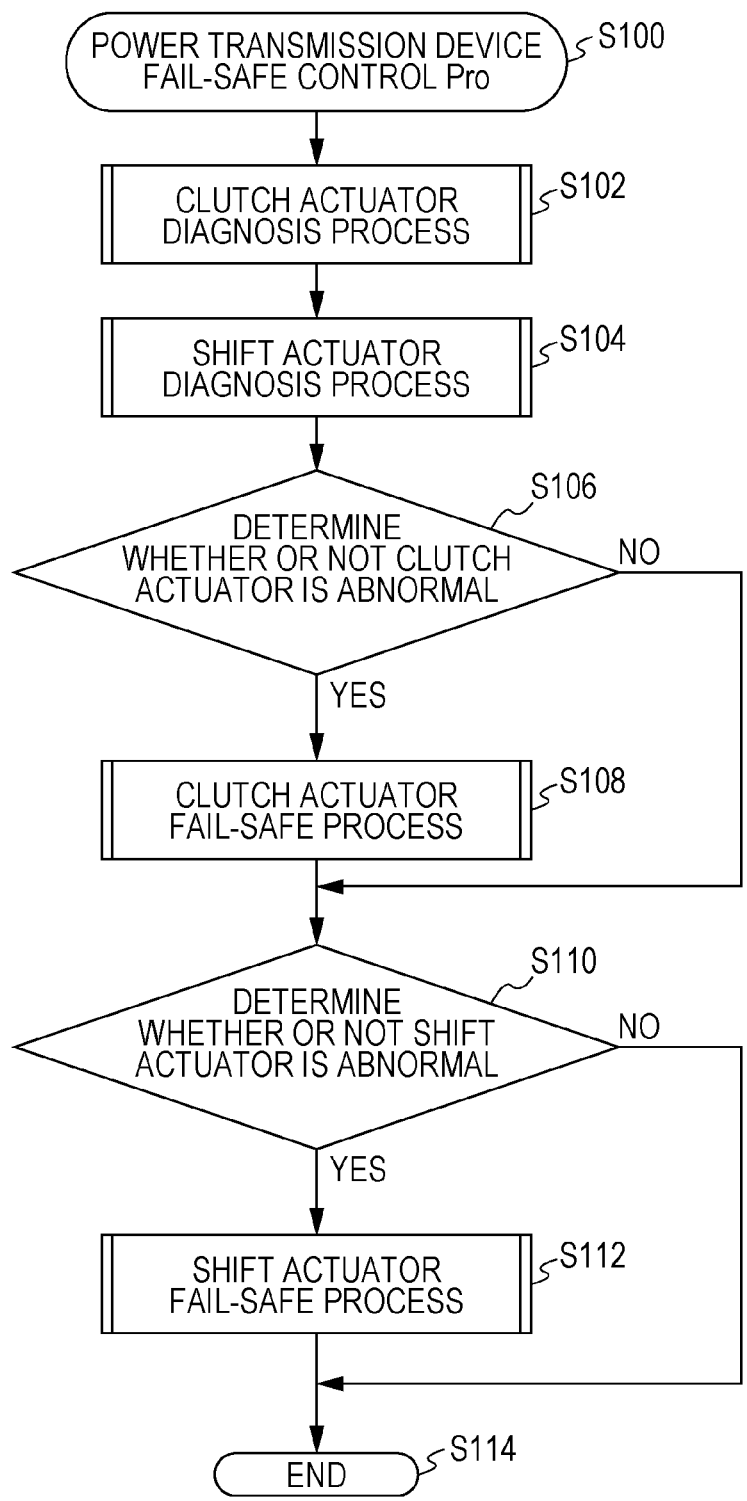
FIG. 6 is a flowchart showing the flow of processes of a power transmission device fail-safe control program to be executed by an ECU illustrated in FIG. 1.

Next, the operation of the vehicle power transmission system 100 configured as described above will be described. In the vehicle power transmission system 100, the ECU 140 controls the operation of the engine 80 and the power transmission device 101. Consequently, the ECU 140 causes the vehicle to travel and also executes the power transmission device fail-safe control program shown in FIG. 6 while the engine 80 is operating. Consequently, the ECU 140 executes the fail-safe control if a fault or failure occurs in the power transmission device 101.

Figure 7:
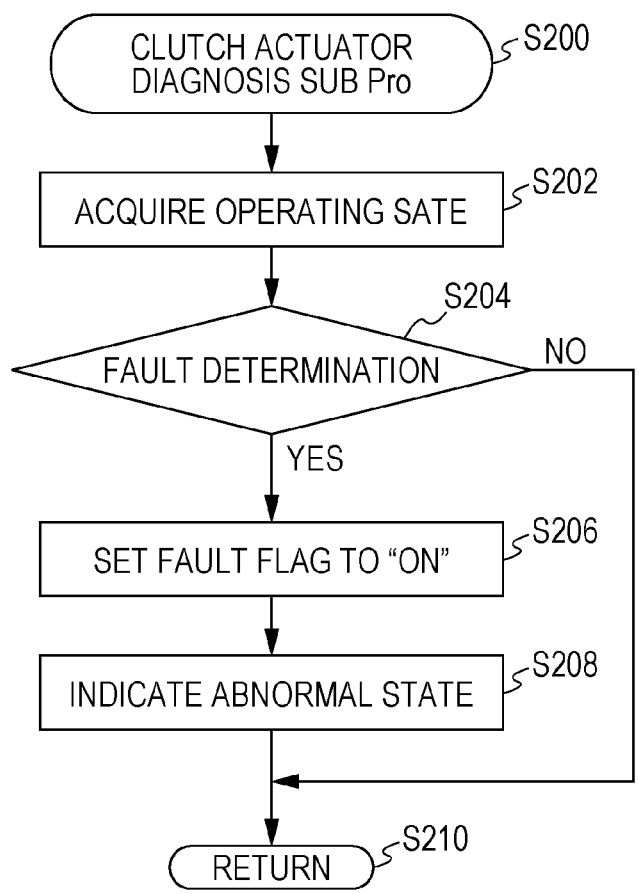
FIG. 7 is a flowchart showing the flow of processes of a clutch actuator diagnosis subprogram to be executed by the ECU illustrated in FIG. 1.

Specifically, when the driver turns on an ignition switch (not illustrated) in the vehicle, the ECU 140 starts executing the power transmission device fail-safe control program in Step S100. The ECU 140 executes a clutch actuator diagnosis process in Step S102. In order to perform the clutch actuator diagnosis process in Step S102, the ECU 140 executes a clutch actuator diagnosis subprogram shown in FIG. 7.

Specifically, the ECU 140 starts executing the clutch actuator diagnosis subprogram in Step S200. The ECU 140 acquires operating state information in Step S202. The operating state information here is information related to the operating state of the clutch 110 (the clutch actuator 117). In the embodiment, the operating state information is values of the angle of rotation of the clutch actuator 117, the current flowing through the clutch actuator 117, and the voltage applied to the clutch actuator 117. Therefore, in Step S202, the ECU 140 acquires the values of the angle of rotation of the clutch actuator 117, the current flowing through the clutch actuator 117, and the voltage applied to the clutch actuator 117, via the clutch actuator sensor 154. In other words, the clutch actuator sensor 154 corresponds to an example of the CA abnormality detection sensor according to the present disclosure. The CA abnormality detection sensor is simply required to be capable of detecting an abnormal state of the clutch actuator 117. The CA abnormality detection sensor may be a sensor that detects a physical amount other than the angle of rotation, the current, and the voltage, for example, a temperature sensor (not illustrated) or vibration sensor (not illustrated).

Next, in Step S204, the ECU 140 makes a fault determination on whether or not the clutch actuator 117 is normal. Specifically, the ECU 140 executes a determination process on whether or not the values of the angle of rotation, current, and voltage of the clutch actuator 117 acquired in S202 are normal values. In this case, the ECU 140 judges whether or not each of the values of the angle of rotation, current, and voltage of the clutch actuator 117 acquired in S202 is within a range of an upper and a lower threshold (a normal range) that defines a normal state. The ECU 140 determines that each value is "normal" if each value is within its normal range. In this case, the normal ranges (threshold values) of the angle of rotation, the current, and the voltage are prestored in the ROM or the like of the ECU 140.

The ECU 140 judges that the clutch actuator 117 is in the normal state if having determined that all the acquired values of the angle of rotation, current, and voltage are normal. The ECU 140 determines to be "No" in Step S204 to proceed to Step S210. On the other hand, the ECU 140 judges that a fault or failure is occurring in the clutch actuator 117 and the clutch actuator 117 is in an abnormal state if at least one of the acquired values of the angle of rotation, the current, and the voltage is noted to not be a normal value. The ECU 140 determines to be "Yes" in Step S204 to proceed to Step S206.

Next, in Step S206, the ECU 140 sets ON (for example, sets "1") for a fault flag indicating that the clutch actuator 117 is in the abnormal state. The ECU 140 subsequently indicates that the clutch actuator 117 is in the abnormal state on the indication device 94 in Step S208 to notify it to the driver. The ECU 140 then ends the execution of the clutch actuator diagnosis subprogram in Step S210 to return to the power transmission device fail-safe control program.

Figure 8:
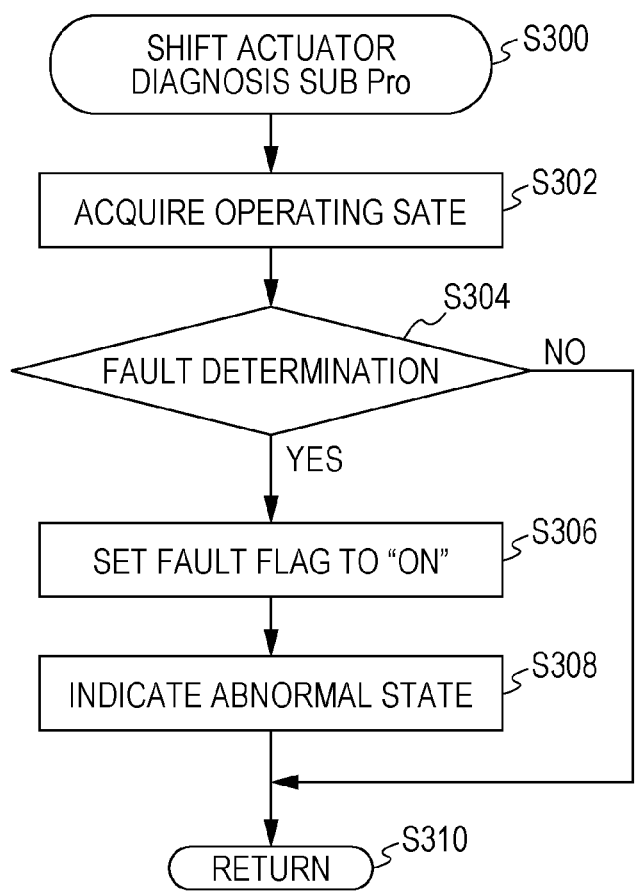
FIG. 8 is a flowchart showing the flow of processes of a shift actuator diagnosis subprogram to be executed by the ECU illustrated in FIG. 1.

Next, the ECU 140 executes a shift actuator diagnosis process in Step S104. In order to perform the shift actuator diagnosis process, the ECU 140 executes a shift actuator diagnosis subprogram shown in FIG. 8.

Specifically, the ECU 140 starts executing the shift actuator diagnosis subprogram in Step S300. The ECU 140 acquires operating state information in Step S302. The operating state information here is information related to the operating state of the clutch 110 (the shift actuator 136). In the embodiment, the operating state information is values of the angle of rotation of the shift actuator 136, the current flowing through the shift actuator 136, and the voltage applied to the shift actuator 136. Therefore, in Step S302, the ECU 140 acquires the values of the angle of rotation of the shift actuator 136, the current flowing through the shift actuator 136, and the voltage applied to the shift actuator 136. In other words, the shift actuator sensor 152 corresponds to an example of the SA abnormality detection sensor according to the present disclosure. The SA abnormality detection sensor is simply required to be capable of detecting an abnormal state of the shift actuator 136. The SA abnormality detection sensor may be a sensor that detects a physical amount other than the angle of rotation, the current, and the voltage, for example, a temperature sensor (not illustrated) or vibration sensor (not illustrated).

Next, in Step S304, the ECU 140 makes a fault determination on whether or not the shift actuator 136 is normal. Specifically, the ECU 140 executes a determination process on whether or not the values of the angle of rotation, current, and voltage of the shift actuator 136 acquired in Step S302 are normal values. In this case, the ECU 140 judges whether or not each of the values of the angle of rotation, current, and voltage of the shift actuator 136 acquired in S302 is within a range of an upper and a lower threshold (a normal range) that defines a normal state. The ECU 140 determines that each value is "normal" if each value is within its normal range. In this case, the normal ranges (threshold values) of the angle of rotation, the current, and the voltage are prestored in the ROM or the like of the ECU 140.

The ECU 140 then judges that the shift actuator 136 is in the normal state if having determined that all the acquired values of the angle of rotation, the current, and the voltage are normal. The ECU 140 determines to be "No" in Step S304 to proceed to Step S310. On the other hand, the ECU 140 judges that a fault or failure is occurring in the shift actuator 136 and the shift actuator 136 is in the abnormal state if at least one of the acquired values of the angle of rotation, the current, and the voltage is noted to not be a normal value. The ECU 140 determines to be "Yes" in Step S304 to proceed to Step S306.

Next, in Step S306, the ECU 140 sets ON (for example, sets "1") for a fault flag indicating that the shift actuator 136 is in the abnormal state. The ECU 140 subsequently indicates that the shift actuator 136 is in the abnormal state on the indication device 94 in Step S308 to notify it to the driver. The ECU 140 then ends the execution of the shift actuator diagnosis subprogram in Step S310 to return to the power transmission device fail-safe control program.

Next, in Step S106, the ECU 140 determines whether or not the clutch actuator 117 is in the abnormal state. Specifically, the ECU 140 determines to be "Yes" in Step S106 if the fault flag set in Step S206 is set to ON, and proceeds to Step S108. On the other hand, the ECU 140 determines to be "No" in Step S106 if the fault flag is not set to ON, and proceeds to Step S110.

Figure 9:
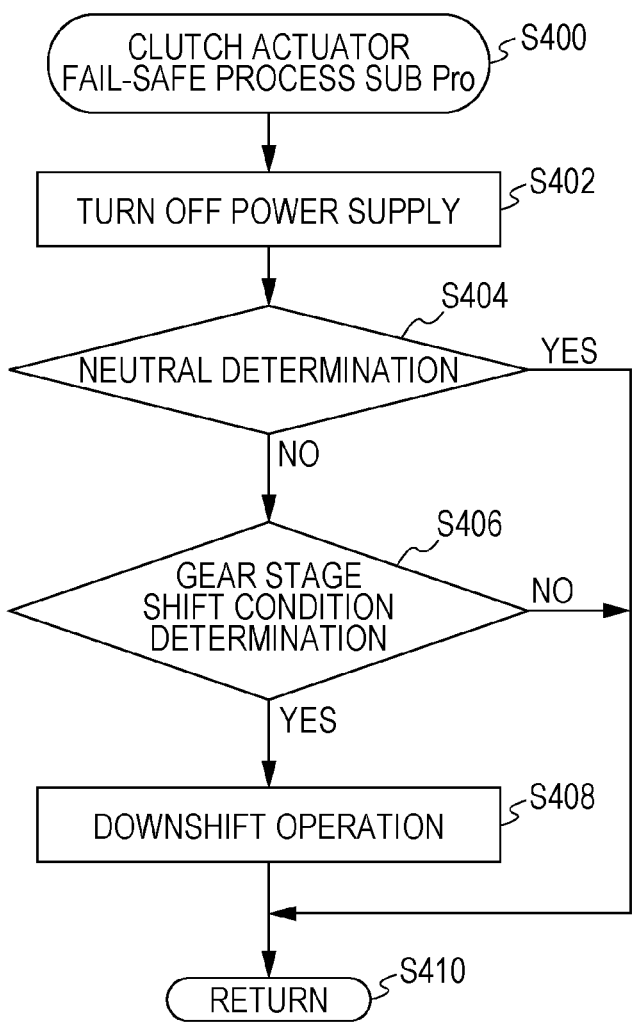
FIG. 9 is a flowchart showing the flow of processes of a clutch actuator fail-safe process subprogram to be executed by the ECU illustrated in FIG. 1.

Next, the ECU 140 executes a fail-safe process of the clutch actuator 117 in Step S108. In order to perform the fail-safe process of the clutch actuator 117, the ECU 140 executes a clutch actuator fail-safe process subprogram shown in FIG. 9.

Specifically, the ECU 140 starts executing the clutch actuator fail-safe process subprogram in Step S400. The ECU 140 stops supplying power to the clutch actuator 117 in Step S402. Consequently, the power supply to the clutch actuator 117 is stopped. Consequently, it is possible to suppress the operation of the clutch actuator 117 from being resumed unexpectedly.

Next, the ECU 140 determines whether or not the selected gear stage in the transmission 130 is in neutral in Step S404. In the determination process in Step S404, the ECU 140 detects the selected gear stage in the transmission 130 via the shift position sensor 153. The ECU 140 determines to be "Yes" in Step S404 if the detected gear stage is neutral, and proceeds to Step S410. On the other hand, the ECU 140 determines to be "No" in Step S404 if the selected gear stage in the transmission 130 is in a gear stage other than neutral, that is, any of the first to fifth gear stages, and proceeds to Step S406.

Figure 10:
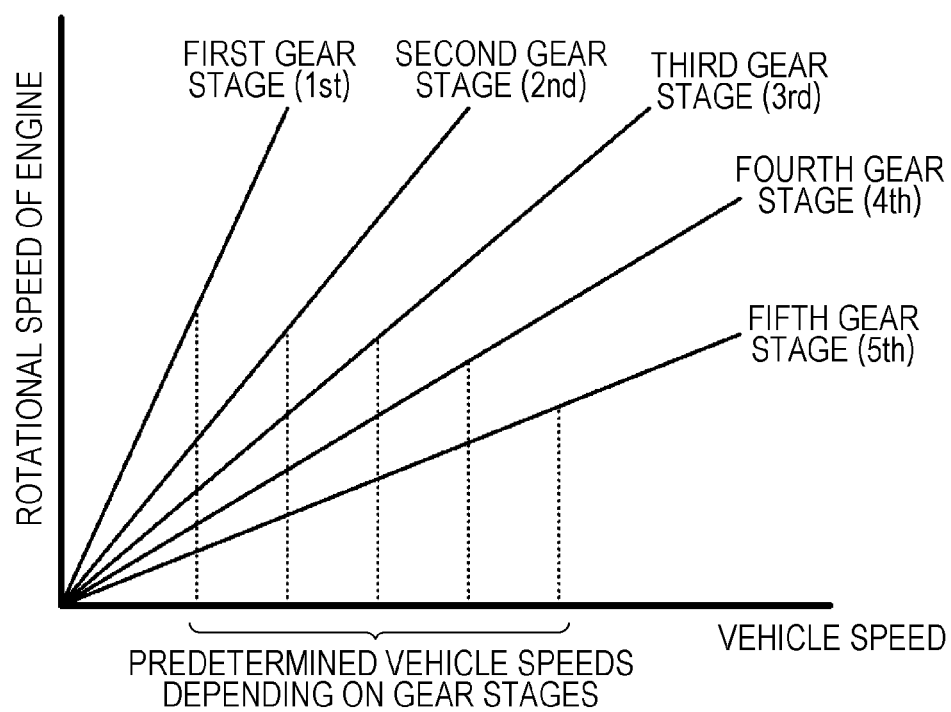
FIG. 10 is an explanatory view showing the relationship between the rotational speed of an engine illustrated in FIG. 1 and a vehicle speed on a gear stage by gear stage basis, and a vehicle speed value that allows a selected gear stage to be shifted (downshifted) into a lower gear stage, the vehicle speed value being specified depending on the gear stage in the transmission.

Next, in Step S406, the ECU 140 makes a gear stage shift condition determination related to the transmission 130. In the process of the gear stage shift condition determination, the ECU 140 determines whether or not the operation of shifting into a gear stage having a lower gear ratio (in other words, a larger speed reduction ratio) than the currently selected gear stage in the transmission 130 is permitted, that is, whether or not the operation of a downshift to a lower gear stage is permitted. In the embodiment, the ECU 140 uses the relationship between the rotational speed of the engine and the vehicle speed, which is shown in FIG. 10. In other words, the ECU 140 detects the current vehicle speed of the vehicle via the vehicle speed sensor 151. Furthermore, the ECU 140 determines whether or not the detected vehicle speed is equal to or less than a predetermined vehicle speed that permits the downshift operation, the predetermined vehicle speed being previously specified depending on the gear stage.

Therefore, the ECU 140 determines to be "Yes" in Step S404 if the current vehicle speed is equal to or less than the predetermined vehicle speed that is previously specified corresponding to the current gear stage, and proceeds to Step S408. On the other hand, the ECU 140 determines to be "No" in Step S404 if the current vehicle speed is not equal to or less than the predetermined vehicle speed that is previously specified corresponding to the current gear stage, and proceeds to Step S410. In this case, the predetermined vehicle speed that permits the downshift operation, the predetermined vehicle speed being specified depending on the gear stage, is prestored in a storage device such as the ROM of the ECU 140. Moreover, the vehicle speed sensor 151 used in Step S406 corresponds to an example of the travelling state detection sensor according to the present disclosure. The travelling state detection sensor is simply required to be capable of detecting the travelling state of the vehicle. The travelling state detection sensor may be a sensor other than the vehicle speed sensor 151, for example, the rotational speed sensor 150 or an acceleration sensor (not illustrated).

Next, the ECU 140 performs the downshift operation in Step S408. Specifically, the ECU 140 controls the operation of the shift actuator 136 to rotationally displace the shift drum 135. Accordingly, the ECU 140 mates the drive-side gear 132 with the driven-side gear 133 to select a gear stage immediately lower than the current gear stage. In this case, the clutch actuator 117 is in the fault state and does not operate. Hence, the ECU 140 shifts the selected gear stage in the transmission 130 while the clutch 110 is in a clutch ON state or in a clutch OFF state.

The clutch 110 is assumed here to be in the clutch ON state being a state where the driving force is transmitted. In this case, if the rotational speed of the main shaft 115 exceeds the rotational speed of the primary driven gear 112, a back torque acts on the clutch 110. Hence, the pressure-side slipper cam portion 120c formed on the pressure plate 120 rides onto the hub-side slipper cam portion 114c formed on the clutch hub 114 (refer to an arrow c) as illustrated in FIG. 4B. The cam operation of the hub-side slipper cam portion 114c and the pressure-side slipper cam portion 120c displaces the pressure plate 120 in the direction away from the clutch hub 114 (refer to an arrow d) while being rotationally displaced relative to the clutch hub 114. In this manner, the slipper function works which reduces the pressing force between the friction plate 113 and the clutch plate 118. Consequently, the ECU 140 can perform the operation of shifting the selected gear stage in the transmission 130 (here, downshifting) relatively smoothly also if the clutch 110 is in the clutch ON state.

On the other hand, it is assumed that the clutch 110 is in the clutch OFF state being a state where the transmission of the driving force is shut off. In this case, the driving force from the engine 80 is not transmitted to the transmission 130. Hence, the ECU 140 can perform the selected gear stage shift operation (here, downshifting) smoothly. If the clutch 110 is in the clutch OFF state, the driving force from the engine 80 is not transmitted to the transmission 130. Hence, the ECU 140 may be configured not to perform the selected gear stage shift operation in this case. However, the ECU 140 is desired to perform the selected gear stage shift operation also if the clutch 110 is in the clutch OFF state, and cause the selected gear stage in the transmission 130 to be shifted into neutral in the end, in preparation for a situation where the clutch 110 enters the clutch ON state unexpectedly.

The ECU 140 ends the execution of the clutch actuator fail-safe process subprogram in Step S410 to return to the power transmission device fail-safe control program.

Next, in Step S110, the ECU 140 determines whether or not the shift actuator 136 is in the abnormal state. Specifically, the ECU 140 determines to be "Yes" in Step S110 if the fault flag set in Step S306 is set to ON, and proceeds to Step S112. On the other hand, the ECU 140 determines to be "No" in Step S110 if the fault flag is not set to ON, and proceeds to Step S114.

Figure 11:
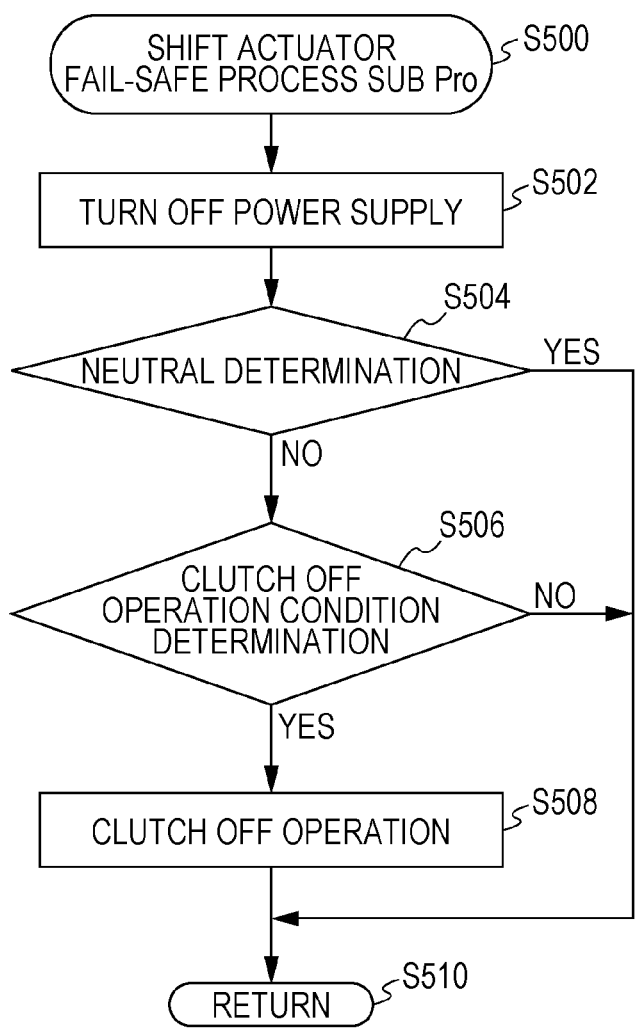
FIG. 11 is a flowchart showing the flow of processes of a shift actuator fail-safe process subprogram to be executed by the ECU illustrated in FIG. 1.

Next, the ECU 140 executes the fail-safe process of the shift actuator 136 in Step S112. In order to perform the fail-safe process of the shift actuator 136, the ECU 140 executes a shift actuator fail-safe process subprogram shown in FIG. 11.

Specifically, the ECU 140 starts executing the shift actuator fail-safe process subprogram in Step S500. The ECU 140 stops supplying power to the shift actuator 136 in Step S502. Consequently, the power supply to the shift actuator 136 is stopped. Hence, it is possible to suppress the operation of the shift actuator 136 from being resumed unexpectedly.

Next, in Step S504, the ECU 140 determines whether or not the selected gear stage in the transmission 130 is in neutral. In the determination process in Step S504, the ECU 140 detects the selected gear stage in the transmission 130 via the shift position sensor 153. The ECU 140 determines to be "Yes" in Step S504 if the detected gear stage is neutral, and proceeds to Step S510. On the other hand, the ECU 140 determines to be "No" in Step S504 if the selected gear stage in the transmission 130 is in a gear stage other than neutral, that is, any of the first to fifth gear stages, and proceeds to Step S506.

Next, in Step S506, the ECU 140 makes a clutch OFF operation condition determination related to the clutch 110. In the process of the clutch OFF operation condition determination, the ECU 140 determines whether or not the clutch OFF operation is permitted. In the clutch OFF operation, the clutch 110 shuts off the transmission of the driving force from the engine 80 to the transmission 130. In the embodiment, the ECU 140 detects the current vehicle speed of the vehicle via the vehicle speed sensor 151. Furthermore, the ECU 140 determines whether or not the detected vehicle speed is equal to or less than a predetermined vehicle speed that is previously specified and permits the clutch OFF operation (for example, 15 km/h).

Therefore, the ECU 140 determines to be "Yes" in Step S506 if the current vehicle speed is equal to or less than the predetermined vehicle speed that is previously specified corresponding to the current gear stage, and proceeds to Step S508. On the other hand, the ECU 140 determines to be "No" in Step S506 if the current vehicle speed is not equal to or less than the predetermined vehicle speed that is previously specified corresponding to the current gear stage, and proceeds to Step S510. In this case, the predetermined vehicle speed that is previously specified depending on the gear stage and permits the clutch OFF operation is prestored in a storage device such as the ROM of the ECU 140.

Next, the ECU 140 performs the clutch OFF operation in Step S508. Specifically, the ECU 140 controls the operation of the clutch actuator 117 to slidingly displace the push rod 116b toward the release bearing 121. Consequently, the push member 116a presses the release bearing 121. Consequently, in the clutch 110, the pressure plate 120 is separated from the friction plate 113. Hence, the friction plate 113 and the clutch plate 118 are separated. As a result, the clutch 110 enters the clutch OFF state where the driving force to be transmitted from the engine 80 to the transmission 130 is shut off. Also in the process of the clutch OFF operation, the slipper function works.

The ECU 140 then ends the execution of the shift actuator fail-safe process subprogram in Step S510 to return to the power transmission device fail-safe control program.

Next, the ECU 140 ends the execution of the power transmission device fail-safe control program in Step S114. The ECU 140 then executes the power transmission device fail-safe control program again after a lapse of a predetermined time (for example, several milliseconds to several hundred milliseconds). In other words, the ECU 140 repeatedly executes the power transmission device fail-safe control program at predetermined time intervals (for example, several milliseconds to several hundred milliseconds) while the engine 80 is operating.

Consequently, the ECU 140 shifts (lowers) a selected gear stage, one by one, in the transmission 130 if an abnormality occurs in the clutch actuator 117 while the vehicle is travelling, and causes the selected gear stage in the transmission 130 to be shifted into neutral before the vehicle finally comes to a stop. Moreover, the ECU 140 shifts (lowers) a selected gear stage, one by one, in the transmission 130 if an abnormality occurs in the clutch actuator 117 while the vehicle is at rest, and causes the selected gear stage in the transmission 130 to be shifted into neutral. In these cases, in the embodiment, the transmission 130 is configured of what is called a return transmission. Hence, if the selected gear stage is the second gear stage, the selected gear stage in the transmission 130 is shifted into neutral by one downshift.

Moreover, the ECU 140 brings the clutch 110 into the clutch OFF state before the vehicle comes to a stop if an abnormality occurs in the shift actuator 136 while the vehicle is travelling. Moreover, the ECU 140 immediately brings the clutch 110 into the clutch OFF state if an abnormality occurs in the shift actuator 136 while the vehicle is at rest.

As understood from the operation description, according to the embodiment, in the vehicle power transmission system 100, when having detected that the vehicle is in the travelling state and that the clutch actuator 117 is abnormal, the ECU 140 controls the operation of the shift actuator 136, and sequentially shifts a selected gear stage (the current gear stage) into a gear stage having a lower gear ratio (a larger speed reduction ratio) than the current gear stage, that is, a lower gear stage, in the transmission 130. Consequently, the ECU 140 causes the selected gear stage in the transmission 130 to be shifted into neutral before the vehicle comes to a stop. Consequently, the ECU 140 can gradually reduce the speed of the vehicle by use of the engine brake to stop the vehicle. As a result, the vehicle power transmission system 100 can decelerate the vehicle early while suppressing the engine from stalling, and enable the vehicle at rest to move.

Furthermore, an aspect of the present disclosure is not limited to the above embodiment. Various modifications can be made to the above embodiment without departing from the object of the technology of the present disclosure.

Figure 12:
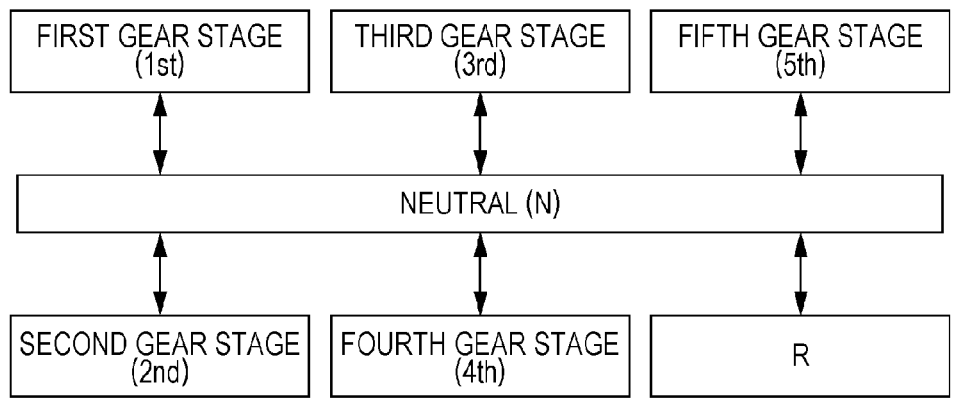
FIG. 12 is an explanatory diagram schematically showing an interrelationship related to shifts of gear stages in a transmission according to a modification of the present disclosure.

For example, in the above embodiment, in the vehicle power transmission system 100, the ECU 140 shifts a selected gear stage into a gear stage immediately lower than the current gear stage in the downshift operation in Step S408. However, in the vehicle power transmission system 100, the ECU 140 may shift the selected gear stage twice or more to a lower gear stage than the current gear stage in the downshift operation in Step S408. In other words, in the vehicle power transmission system 100, for example, the transmission 130 may be an H pattern where the gear stages are formed adjacent to neutral (N) as shown in FIG. 12. In this case, the ECU 140 can also shift the selected gear stage twice to a lower gear stage than the current gear stage. In other words, the vehicle on which the vehicle power transmission system 100 is mounted may be a four-wheeled motor vehicle such as a four-wheeled drive buggy car in addition to a two-wheeled motor vehicle.

Figure 13:
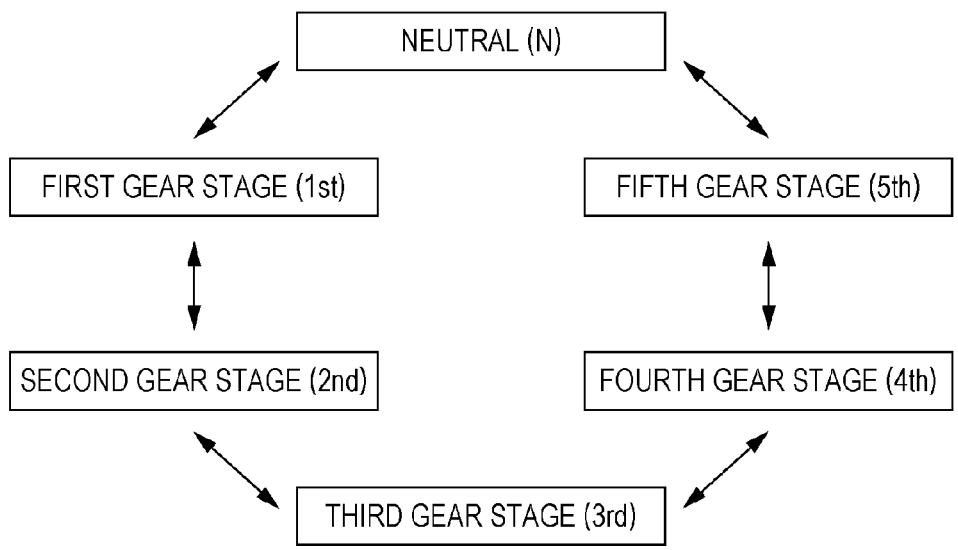
FIG. 13 is an explanatory diagram schematically showing an interrelationship related to shifts of gear stages in a transmission according to another modification of the present disclosure.

In the above embodiment, the transmission 130 has a configuration of what is called a return system where the gear stages are arranged in series. The transmission 130 may have a configuration other than the return system, for example, a configuration of what is called a rotary system shown in FIG. 13. In the rotary transmission, neutral (N), the first gear stage (1st), the second gear stage (2nd), the third gear stage (3rd), the fourth gear stage (4th), and the fifth gear stage (5th) are arranged in this order. A shift between adjacent gear stages can be made. Furthermore, a shift from the fifth gear stage (5th) to neutral (N) can be made.

Figure 14A:
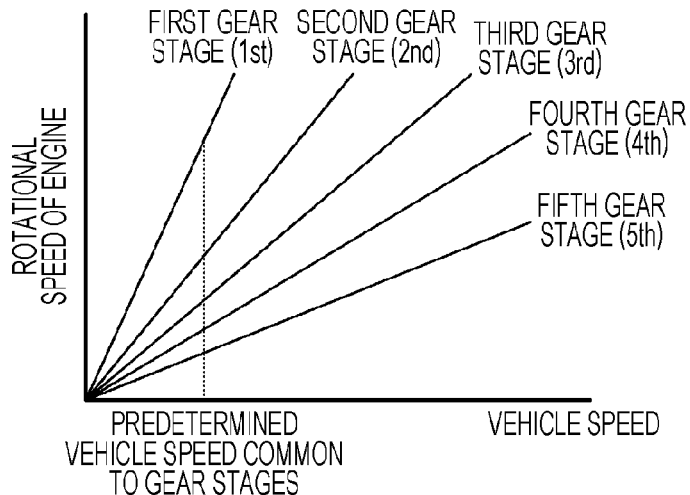
FIGS. 14A to 14C show variations in gear stage shift conditions related to shifting a selected gear stage in the transmission into a lower gear stage in a vehicle power transmission system according to another modification of the present disclosure.
Figure 14B:
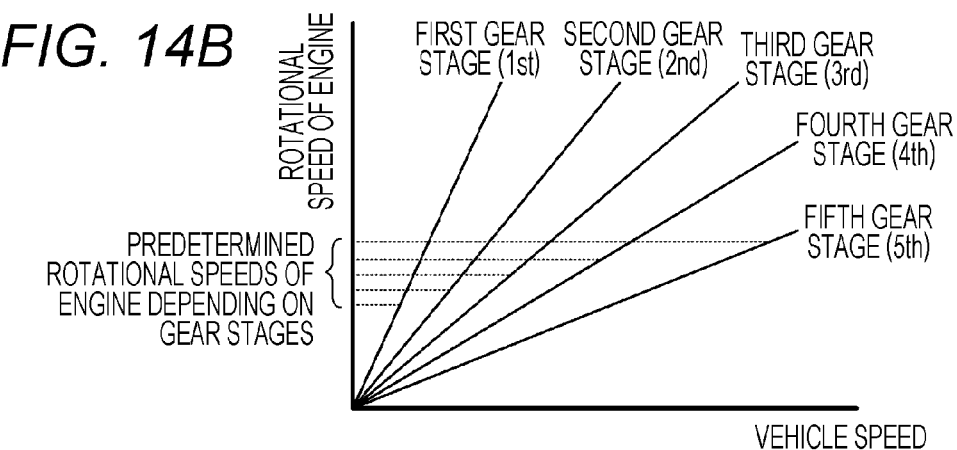
Figure 14C:
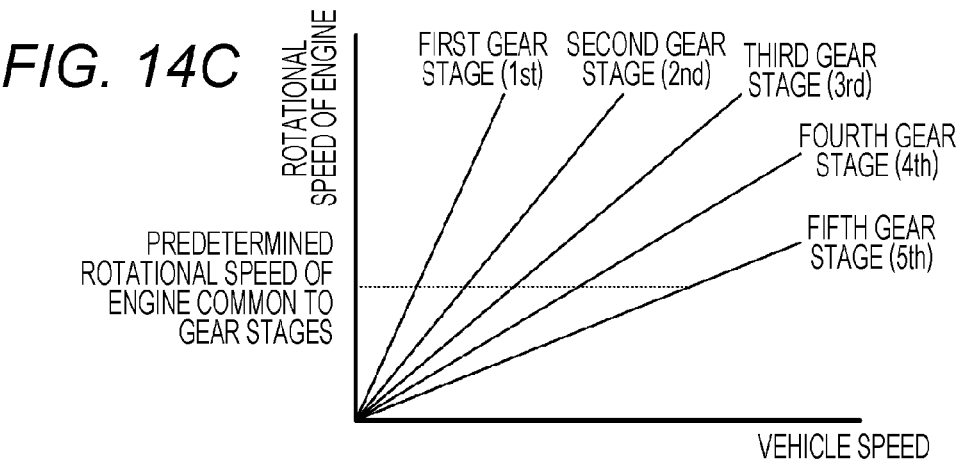

Moreover, in the above embodiment, the ECU 140 performs the gear stage shift condition determination process in Step S406. Consequently, the ECU 140 is configured to execute the downshift operation in Step S408 if the vehicle speed is equal to or less than a speed of the vehicle that is set depending on the gear stage. However, the ECU 140 can also set the gear stage shift condition to execute the downshift operation to that the vehicle speed is equal to or less than one predetermined speed common to the gear stages, as shown in FIG. 14A. Moreover, the ECU 140 can also set the gear stage shift condition to execute the downshift operation to that the rotational speed of the engine 80 is equal to or less than a predetermined rotational speed of the engine 80 that is set depending on the gear stage, as shown in FIG. 14B. Alternatively, the ECU 140 can also set the gear stage shift condition to that the rotational speed of the engine 80 is equal to or less than one predetermined rotational speed common to the gear stages, as shown in FIG. 14C. Moreover, the ECU 140 can also set the gear stage shift condition that both the vehicle speed and the engine rotational speed have reduced to or below their predetermined values.

Moreover, the ECU 140 can also set a condition other than the condition on the vehicle speed or the engine rotational speed as the gear stage shift condition. For example, the ECU 140 can also set, as the gear stage shift condition, when the deceleration of the vehicle reaches a predetermined value or more, when a braking operation by the driver is continued for a predetermined time or more during the travel of the vehicle, or when an acceleration operation by the driver is not performed for a predetermined time or more during the travel of the vehicle. Moreover, the ECU 140 can also omit the gear stage shift condition determination process in Step S406. In this case, the ECU 140 is configured to execute the downshift operation immediately after the neutral determination in Step S404.

Moreover, in the above embodiment, the ECU 140 makes the clutch OFF operation condition determination in Step S506. Consequently, the ECU 140 is configured to execute the clutch OFF in Step S508 if the vehicle speed is equal to or less than the speed of the vehicle that is preset corresponding to the current gear stage. However, the ECU 140 can adopt that the rotational speed of the engine 80 is equal to or less than a predetermined rotational speed of the engine 80 that is set depending on the gear stage instead of or in addition to the condition on the vehicle speed, as the clutch OFF operation condition, as in the above description. Alternatively, the ECU 140 can also set a condition other than the condition on the vehicle speed or the engine rotational speed as the gear stage shift condition. For example, the ECU 140 can also set, as the gear stage shift condition, when the deceleration of the vehicle reaches a predetermined value or more, when a braking operation by the driver is continued for a predetermined time or more during the travel of the vehicle, or when an acceleration operation by the driver is not performed for a predetermined time or more during the travel of the vehicle. Moreover, the ECU 140 can also omit the clutch OFF operation condition determination process in Step S506. In this case, the ECU 140 is configured to execute the clutch OFF operation immediately after the neutral determination in Step S504.

Moreover, in the above embodiment, the ECU 140 is configured to execute both the fail-safe control upon a fault in the clutch actuator 117 and the fail-safe control upon a fault in the shift actuator 136. However, the ECU 140 can be configured to execute at least one of the fail-safe control upon a fault in the clutch actuator 117 and the fail-safe control upon a fault in the shift actuator 136. In other words, the ECU 140 can be configured to execute the fail-safe control upon a fault in the clutch actuator 117, omitting the fail-safe control upon a fault in the shift actuator 136. In this case, the vehicle power transmission system 100 does not need to include the SA abnormality detection sensor.

Moreover, in the above embodiment, the ECU 140 acquires the operating states of the clutch actuator 117 and the shift actuator 136 irrespective of the speed of the vehicle in the processes of acquiring the operating states in Steps S202 and S302. In other words, in the above embodiment, the ECU 140 is configured to execute both the fail-safe control upon a fault in the clutch actuator 117 and the fail-safe control upon a fault in the shift actuator 136 also if the vehicle is at rest. However, the ECU 140 can be configured to execute both the fail-safe control upon a fault in the clutch actuator 117 and the fail-safe control upon a fault in the shift actuator 136 only when the vehicle is travelling. In this case, the ECU 140 is simply required to execute the processes of acquiring the operating states of Steps S202 and S302 only when the vehicle is travelling.

Moreover, in the above embodiment, the vehicle power transmission system 100 includes the clutch 110 having both the assist mechanism and the slipper mechanism. However, the clutch 110 can also be configured not to include at least one or both of the assist mechanism and the slipper mechanism.

Moreover, in the above embodiment, the ECU 140 indicates the abnormal state on the indication device 94 in Step S208 and/or Step S308 when it has been determined that the clutch actuator 117 and/or the shift actuator 136 are/is in the abnormal state. The ECU 140 subsequently executes the downshift operation and/or the clutch OFF operation in Step S408 and/or Step S508. However, the ECU 140 is not necessarily required to indicate the abnormal state on the indication device 94 when it has been determined that the clutch actuator 117 and/or the shift actuator 136 are/is in the abnormal state. The ECU 140 can also be configured to execute the downshift operation and/or the clutch OFF operation without indicating the abnormal state.

On the other hand, the ECU 140 can also be configured to execute the downshift operation and/or the clutch OFF operation in Step S408 and/or Step S508 in accordance with an instruction of the driver of the vehicle when it has been determined that the clutch actuator 117 and/or the shift actuator 136 are/is in the abnormal state.

For example, the ECU 140 indicates the abnormal state on the indication device 94 in Step S208 and/or Step S308 when it has been determined that the clutch actuator 117 and/or the shift actuator 136 are/is in the abnormal state. Furthermore, the ECU 140 prompts the driver of the vehicle to input an instruction to start the execution of the downshift operation and/or the clutch OFF operation. The ECU 140 then executes the downshift operation and/or the clutch OFF operation in Step S408 and/or Step S508 when the drive has input the execution start instruction (for example, a long press on the shift switch 93). Consequently, the driver can freely select the execution or non-execution of the downshift operation and/or the clutch OFF operation. Furthermore, the driver can grasp the start of the downshift operation and/or the clutch OFF operation in advance.

Embodiments of the present disclosure may be the following first to eighth vehicle power transmission systems.

The first vehicle power transmission system is a vehicle power transmission system including: a transmission that transmits a driving force of an engine mounted in a vehicle to a drive wheel of the vehicle while changing speeds with a plurality of gear stages having different gear ratios from each other; a shift actuator that selectively shifts the plurality of gear stages in the transmission; a clutch that transmits or shuts off the driving force transmitted from the engine to or from the transmission; a clutch actuator that mutually switches between the transmission and the shutting off of the driving force at the clutch; and a control device that controls operation of both the shift actuator and the clutch actuator. The vehicle power transmission system includes a travelling state detection sensor for detecting whether the vehicle is in a travelling state or stopping state, a CA abnormality detection sensor for detecting whether the clutch actuator is normal or abnormal, and a shift position sensor for detecting a selected state of the plurality of gear stages in the transmission. When having detected that the vehicle is in the travelling state and that the clutch actuator is abnormal by use of the travelling state detection sensor and the CA abnormality detection sensor, the control device controls the operation of the shift actuator to cause the transmission to shift into neutral before the vehicle comes to a stop while shifting gear stages into a gear stage having a lower gear ratio (a larger speed reduction ratio).

The second vehicle power transmission system is the first vehicle power transmission system. The clutch includes a clutch hub that holds a clutch plate placed facing a friction plate that is rotationally driven by the driving force transmitted from the engine, and that transmits the driving force to the transmission, and a pressure plate that is placed adjacently so as to be approachable to or separable from the clutch hub and relatively rotatable, and elastically presses the friction plate or the clutch plate by a pressure elastic body. The clutch hub and the pressure plate include a hub-side slipper cam portion and a pressure-side slipper cam portion, respectively, each of which is formed of an inclined surface for reducing a pressing force between the friction plate and the clutch plate when a rotational speed on the drive wheel side becomes higher than a rotational speed on the engine side.

The third vehicle power transmission system is the first or second vehicle power transmission system. The control device causes the transmission to shift into neutral before the vehicle comes to a stop while shifting gear stages to an immediate gear stage.

The fourth vehicle power transmission system is any one of the first to third vehicle power transmission systems, and further includes at least one of a vehicle speed sensor that detects the speed of the vehicle and a rotational speed sensor that detects the rotational speed of the engine. When at least one of the speed of the vehicle and the rotational speed of the engine is found to be equal to or less than a predetermined value by use of at least one of the vehicle speed sensor and the rotational speed sensor, the control device controls the operation of the shift actuator to cause the transmission to shift into neutral before the vehicle comes to a stop while shifting gear stages to a gear stage having a lower gear ratio.

The fifth vehicle power transmission system is the fourth vehicle power transmission system. The predetermined value is set depending on the gear stage in the transmission.

The sixth vehicle power transmission system is any one of the first to fifth vehicle power transmission systems. When having detected that the vehicle is in the stopping state and that the clutch actuator is abnormal by use of the travelling state detection sensor and the CA abnormality detection sensor, the control device controls the operation of the shift actuator to shift gear stages into neutral in the transmission.

The seventh vehicle power transmission system is any one of the fourth to sixth vehicle power transmission systems, and further includes an SA abnormality detection sensor for detecting whether the shift actuator is normal or abnormal. When having detected that the vehicle is in the travelling state and that the shift actuator is abnormal by use of the travelling state detection sensor and the SA abnormality detection sensor, the control device controls the operation of the shift actuator to change the clutch to a state where the driving force is shut off if at least one of the speed of the vehicle and the rotational speed of the engine is found to be equal to or less than the predetermined value by use of at least one of the vehicle speed sensor and the rotational speed sensor.

The eighth vehicle power transmission system is any one of the first to seventh vehicle power transmission systems, and further includes an input device for inputting an instruction of a driver of the vehicle into the control device, and an indication device operated and controlled by the control device to indicate information for the driver. The control device causes the indication device to indicate that an abnormality has been detected in the clutch actuator, and controls the operation of the shift actuator in accordance with the driver's instruction input via the input device to shift gear stages into a gear stage having a lower gear ratio in the transmission.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A vehicle power transmission system comprising:
   a transmission including a plurality of gear stages having gear ratios different from each other, the transmission being configured to transmit a driving force of an engine mounted in a vehicle to a drive wheel of the vehicle while changing the driving force by a selected gear stage;
   a shift actuator for shifting the selected gear stage in the transmission;
   a clutch for transmitting or shutting off the driving force transmitted from the engine to or from the transmission;
   a clutch actuator for mutually switching between the transmitting and the shutting off of the driving force at the clutch;
   a travelling state detection sensor for detecting whether the vehicle is in a travelling state or in a stopping state;
   a CA abnormality detection sensor for detecting whether the clutch actuator is normal or abnormal;
   a shift position sensor for detecting the selected gear stage in the transmission; and
   a control device for controlling operation of the shift actuator and the clutch actuator, the control device being configured to, when having detected that (a) the vehicle is in the travelling state and that the clutch actuator is abnormal by use of the travelling state detection sensor and the CA abnormality detection sensor, and (b) that the selected gear state of the transmission is not neutral, detect a current speed of the vehicle by use of the travelling state detection sensor;
   the control device being further configured to, when the detected current speed is equal to or less than a speed predetermined per gear stage, control the operation of the shift actuator and cause the selected gear stage in the transmission to be shifted into neutral before the vehicle comes to a stop while shifting the selected gear stage in the transmission into a gear stage having a lower gear ratio.

2. The vehicle power transmission system according to claim 1, wherein
   the clutch includes a clutch hub and a pressure plate placed adjacently so as to be approachable to or separable from the clutch hub and be relatively rotatable, the clutch hub holding a clutch plate placed facing a friction plate to be rotationally driven by the driving force transmitted from the engine and transmitting the driving force to the transmission, the pressure plate elastically pressing the friction plate or the clutch plate by a pressure elastic body,
   the clutch huh and the pressure plate include a hub-side slipper cam portion and a pressure-side slipper cam portion respectively, and
   the hub-side slipper cam portion and the pressure-side slipper cam portion each includes an inclined surface for reducing a pressing force between the friction plate and the clutch plate when a rotational speed of the drive wheel becomes higher than a rotational speed of the engine.

3. The vehicle power transmission system according to claim 1, wherein
   the control device causes the selected gear stage in the transmission to be shifted into neutral before the vehicle comes to a stop while shifting the selected gear stage in the transmission into an immediate gear stage.

4. The vehicle power transmission system according to claim 1, further comprising at least one of a vehicle speed sensor for detecting the speed of the vehicle and a rotational speed sensor for detecting the rotational speed of the engine, wherein when at least one of the speed of the vehicle and the rotational speed of the engine is found to be equal to or less than a predetermined value by use of at least one of the vehicle speed sensor and the rotational speed sensor, the control device controls the operation of the shift actuator, and causes the selected gear stage in the transmission to be shifted into neutral before, the vehicle comes to a stop while shifting the selected gear stage in the transmission into the gear stage having a lower gear ratio.

5. The vehicle power transmission system according to claim 4, wherein the predetermined value is set depending on the gear stage in the transmission.

6. The vehicle power transmission system according to claim 1, wherein when having detected that the vehicle is in the stopping state and that the clutch actuator is abnormal by use of the travelling state detection sensor and the CA abnormality detection sensor, the control device controls the operation of the shift actuator and shifts the selected gear stage in the transmission into neutral.

7. The vehicle power transmission system according to claim 4, further comprising an SA abnormality detection sensor for detecting whether the shift actuator is normal or abnormal, wherein when having detected that the vehicle is in the travelling state and that the shift actuator is abnormal by use of the travelling state detection sensor and the SA abnormality detection sensor, the control device controls the operation of the actuator and switches the clutch to a state where the driving force is shut off upon finding that at least one of the speed of the vehicle and the rotational speed of the engine is equal to or less than the predetermined value by use of at least one of the vehicle speed sensor and the rotational speed sensor.

8. The vehicle power transmission system according to claim 1, further comprising:

an input device for transmitting, to the control device, an instruction input by a driver of the vehicle; and an indication device to be operated and controlled by the control device to indicate information for the driver, wherein when having detected that the clutch actuator is abnormal, the control device causes the indication device to indicate the abnormality of the clutch actuator, and controls the operation of the shift actuator in accordance with the driver's instruction transmitted via the input device to shift the selected gear stage in the transmission into the gear stage having a lower gear ratio.

* * * * *